United States Patent
Jach et al.

(10) Patent No.: US 8,342,012 B2
(45) Date of Patent: Jan. 1, 2013

(54) METHOD FOR PERFORMING DIAGNOSTICS ON LINE SYSTEMS OF INTERNAL COMBUSTION ENGINES

(75) Inventors: Olaf Jach, Boeblingen (DE); Joerg Oberbeck, Bruchsal (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 101 days.

(21) Appl. No.: 12/973,135

(22) Filed: Dec. 20, 2010

(65) Prior Publication Data

US 2011/0146391 A1    Jun. 23, 2011

(30) Foreign Application Priority Data

Dec. 19, 2009    (DE) .......................... 10 2009 059 662

(51) Int. Cl.
*G01M 15/04*    (2006.01)
(52) U.S. Cl. .................................................. 73/114.32
(58) Field of Classification Search ............... 73/114.01, 73/114.32
See application file for complete search history.

(56) References Cited

U.S. PATENT DOCUMENTS

| | | | |
|---|---|---|---|
| 5,792,949 A * | 8/1998 | Hewelt et al. | 73/114.01 |
| 5,897,597 A * | 4/1999 | O'Daniel | 123/574 |
| 6,739,310 B2 * | 5/2004 | Esteghlal et al. | 123/295 |
| 6,761,154 B2 * | 7/2004 | Takagi et al. | 123/520 |
| 6,779,388 B2 * | 8/2004 | Baeuerle et al. | 73/114.31 |
| 6,932,068 B2 * | 8/2005 | Osanai | 123/674 |
| 7,017,558 B2 * | 3/2006 | Osanai | 123/520 |
| 7,080,547 B2 * | 7/2006 | Beyer et al. | 73/114.37 |
| 7,567,867 B2 * | 7/2009 | Herz et al. | 701/114 |
| 8,145,406 B2 * | 3/2012 | Satou | 701/103 |

FOREIGN PATENT DOCUMENTS

| | | |
|---|---|---|
| DE | 10 2005 010 785 A1 | 9/2006 |
| DE | 102005010785 A1 | 9/2006 |
| WO | 2006092223 A1 | 9/2006 |

* cited by examiner

*Primary Examiner* — Freddie Kirkland, III
(74) *Attorney, Agent, or Firm* — Leydig, Voit & Mayer, Ltd.

(57) ABSTRACT

In a method for performing diagnostics on line systems, in particular crank casing venting systems of internal combustion engines, a correction value for an operating parameter of the internal combustion engine is formed in each of at least two chronologically successive determining steps. The correction values or values which are derived therefrom are used to detect a faulty state of the line system.

7 Claims, 2 Drawing Sheets

METHOD FOR PERFORMING DIAGNOSTICS ON LINE SYSTEMS OF INTERNAL COMBUSTION ENGINES

CROSS-REFERENCE TO RELATED APPLICATION

This application claims the priority, under 35 U.S.C. §119, of German application DE 10 2009 059 662.3-52, filed Dec. 19, 2009; the prior application is herewith incorporated by reference in its entirety.

BACKGROUND OF THE INVENTION

Field of the Invention

The invention relates to a method for performing diagnostics on line systems, in particular crank casing venting systems of internal combustion engines, in which method a correction value for an operating parameter of the internal combustion engine is formed in each of at least two chronologically successive determining steps.

For environmental protection reasons, it is not permitted for internal combustion engines to emit blow-by gases into the open air. For this reason, crank casing venting systems have been developed which feed the blow-by gases back into the intake section of the internal combustion engine.

U.S. legislation requires diagnostics to be performed on leakages in the crank casing venting system.

The prior art also discloses methods for correcting an air mass flow rate measuring error during the operation of an internal combustion engine of a motor vehicle. For example, published, non-prosecuted German patent application DE 10 2005 010 785 A1 describes that correction values are determined and used in the engine control unit to carry out correction of the air mass flow rate measuring error. The correction values are formed by reconciliation of a current HFM-(hot film air mass flow rate meter) sensor air mass flow rate with an air mass flow rate which is itself calculated from a volumetric efficiency model.

In order to be able to meet the abovementioned environmental protection requirements, such systems must be equipped with complex technology (additional hardware, expensive plug connections).

SUMMARY OF THE INVENTION

It is accordingly an object of the invention to provide a method for performing diagnostics on line systems of internal combustion engines which overcomes the above-mentioned disadvantages of the prior art methods of this general type, in a way which is less complex and more cost-effective compared to the prior art.

With the foregoing and other objects in view there is provided, in accordance with the invention a method for performing diagnostics on a line system, including a crank casing venting system of an internal combustion engine. The method includes the steps of forming a correction value for an operating parameter of the internal combustion engine in each of at least two chronologically successive determining steps; and using the correction values or values which are derived therefrom to detect a faulty state of the line system.

The method serves to perform diagnostics on line systems, in particular crank casing venting systems of internal combustion engines. In the method, a correction value for an operating parameter of the internal combustion engine is formed in each of at least two chronologically successive determining steps. The correction values or values which are derived therefrom are used to detect a faulty state of the line system. Possible correction values are, for example, correction values for correcting an air mass flow rate measuring error or correction values for a manipulated variable of an actuator (for example a throttle valve), or further correction values which are suitable for the present purpose and which are only conceivable for some other operating parameters. The term "correction value" includes according to the wording of this text both a time-discrete individual correction value and averaging over a plurality of such individual correction values. The correction values for correcting an air mass flow rate measuring error may be determined, for example, in the way described in published, non-prosecuted German patent application DE 10 2005 010 785 A1.

According to one refinement of the method according to the invention, the determining steps are each carried out in an idling phase of the internal combustion engine.

In one embodiment of the method according to the invention, a comparison operation is carried out which includes a comparison of the present correction value with a reference value, and a conclusion that there is an intact line system, and acceptance of the present correction value as a new reference value for a subsequent comparison operation when at least one criterion of the comparison is met.

According to one embodiment variant of the method according to the invention, a first initial correction value is determined in an initial comparison operation in a first idling phase. A second initial correction value is determined in a second idling phase which follows the first idling phase. The two initial correction values are compared with one another in an initial comparison, and one of the initial correction values is accepted as the reference value depending on the result of the initial comparison.

In one embodiment of the method according to the invention, when a criterion of the initial comparison is met, the method is continued in a subsequent follow-on comparison operation which follows the initial comparison operation. In this context, a further correction value is determined in the follow-on comparison operation and the further correction value is compared with the valid reference value in a follow-on comparison. It is concluded that there is a defective or intact line system depending on the result of the follow-on comparison.

According to one refinement of the method according to the invention, the difference between the comparison partners which are to be respectively compared in at least one of the comparisons is formed. In addition a threshold value is predefined. The comparison criterion relates to the relative position of the difference or the absolute value of the difference from the threshold value. This makes it easily possible to test the function capability of the line system. If the difference exceeds the threshold value, an error is detected, otherwise it is concluded that there is an intact line system.

For example, the formation of at least one of the correction values takes place only if predefined diagnostic conditions (for example temperature, altitude, load, length of idling etc.) which prevail at the respective time are met.

In one embodiment of the method according to the invention, the respective last valid reference value of concluded diagnostics is stored in a non-volatile data memory. This makes it ultimately possible to ensure that a plurality of driving cycles can be evaluated. If a correction value is found to be "not satisfactory", driving cycles can be compared with the original reference value in order, if appropriate, to detect a single atypical value in the measurement.

The invention provides the precondition for increasing the robustness and reliability of load-detecting diagnostics even in the case of relatively high mileage/kilometrage readings. In combination with already existing diagnostics the innovative solution makes it possible to differentiate between creeping effects and spontaneous effects, which may be very useful for troubleshooting at a motor vehicle workshop.

Other features which are considered as characteristic for the invention are set forth in the appended claims.

Although the invention is illustrated and described herein as embodied in a method for performing diagnostics on line systems of internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
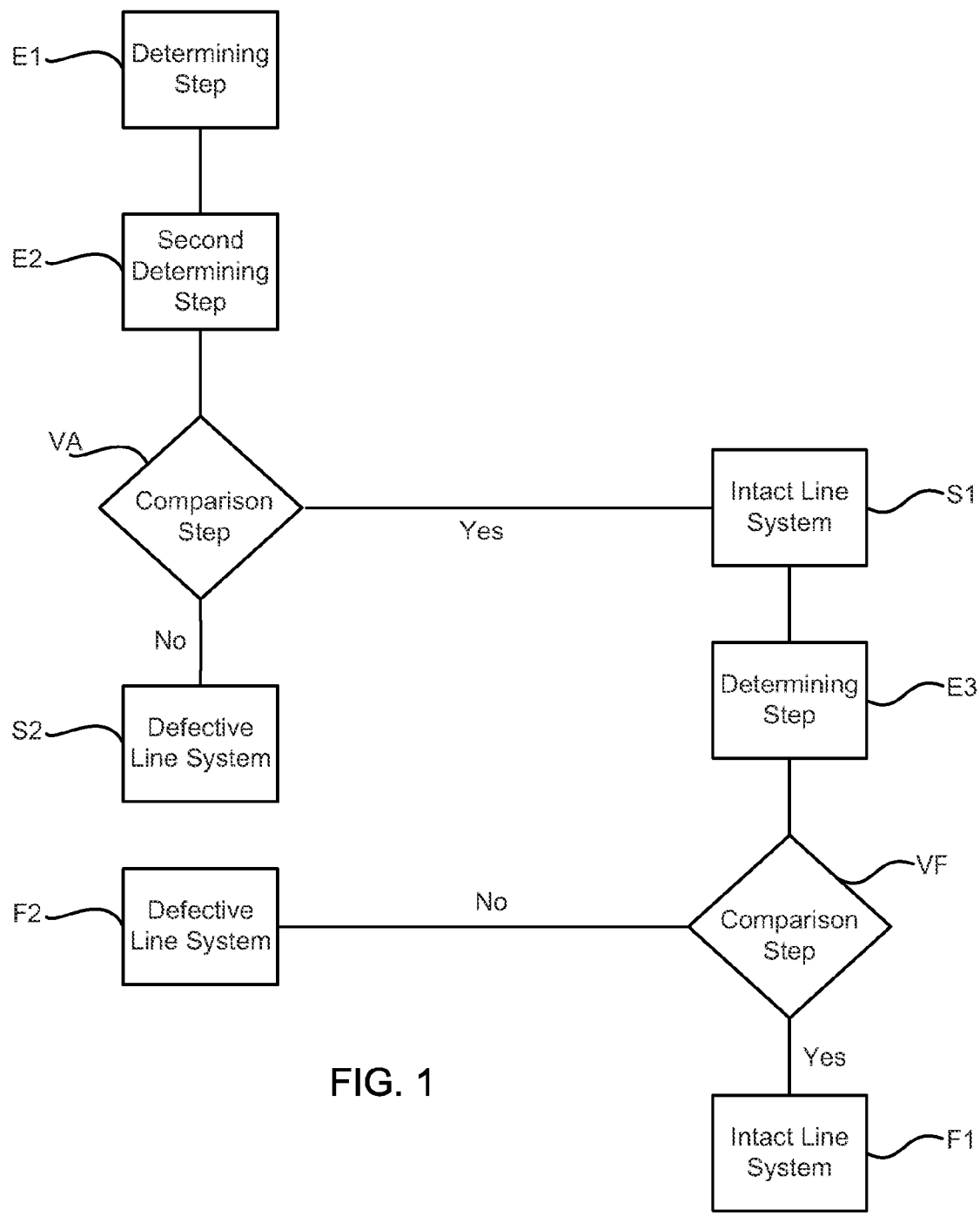
FIG. 1 is a flowchart of a method according to the invention.

FIG. 1 shows a flowchart of a method according to the invention. The method according to the invention starts in a first determining step E1, which is carried out in a first idling phase LP1 (see FIG. 2) of an internal combustion engine. In the first determining step E1, a first initial correction value K1 (see FIG. 2) is formed. After the first determining step E1 the method is continued in a second determining step E2, which is carried out in the second idling phase LP2 (see FIG. 2) which follows the first idling phase LP1. In the second determining step E2, which is carried out in a way analogous to the first determining step E1, a second initial correction value K2 (see FIG. 2) is formed.

The second determining step E2 is followed by an initial comparison step VA, in which it is tested whether the difference (or the absolute value of the difference) between the first initial correction value K1 and the second initial correction value K2 is greater than or equal to a threshold value which can be applied.

Given a positive test result of the initial comparison step VA (threshold value is exceeded or reached), the method according to the invention is continued in step S2, while in the event of a negative test result of the initial comparison step VA (threshold value is undershot) the method is continued in step S1.

In step S2, it is concluded that there is a defective line system and at the same time the first initial correction value K1 is stored as a reference value in a memory. In this case, the first initial correction value K1 is required for fault recovery or for fault confirmation. The method can be ended, for example, in S2.

In step S1 it is concluded that there is an intact line system and at the same time the second initial correction value K2 is stored as a reference value in a memory.

After the step S1, the method is continued in a follow-on determining step E3 which is carried out in the third idling phase LP3 (see FIG. 2) which is the next after the second idling phase LP2. In the follow-on determining step E3, a follow-on correction value K3 is formed. The follow-on determining step E3 is followed by a follow-on comparison step VF in which it is tested whether the difference (or the absolute value of the difference) between the follow-on correction value K3 and the currently valued reference value is greater than or equal to the threshold value T.

Given a positive test result of the follow-on comparison step VF (the threshold value is exceeded or reached), the method according to the invention is continued in step F2, while in the event of a negative test result of follow-on comparison step VF (the threshold value is undershot) the method is continued in step F1.

In step F1 it is concluded that there is an intact line system. The method can be continued, for example, to step F1 by entering a loop in step E3, or can also be ended, as shown in the flowchart, after step F1.

In step F2, it is concluded that there is a defective line system and the method is ended, for example.

Figure 2:
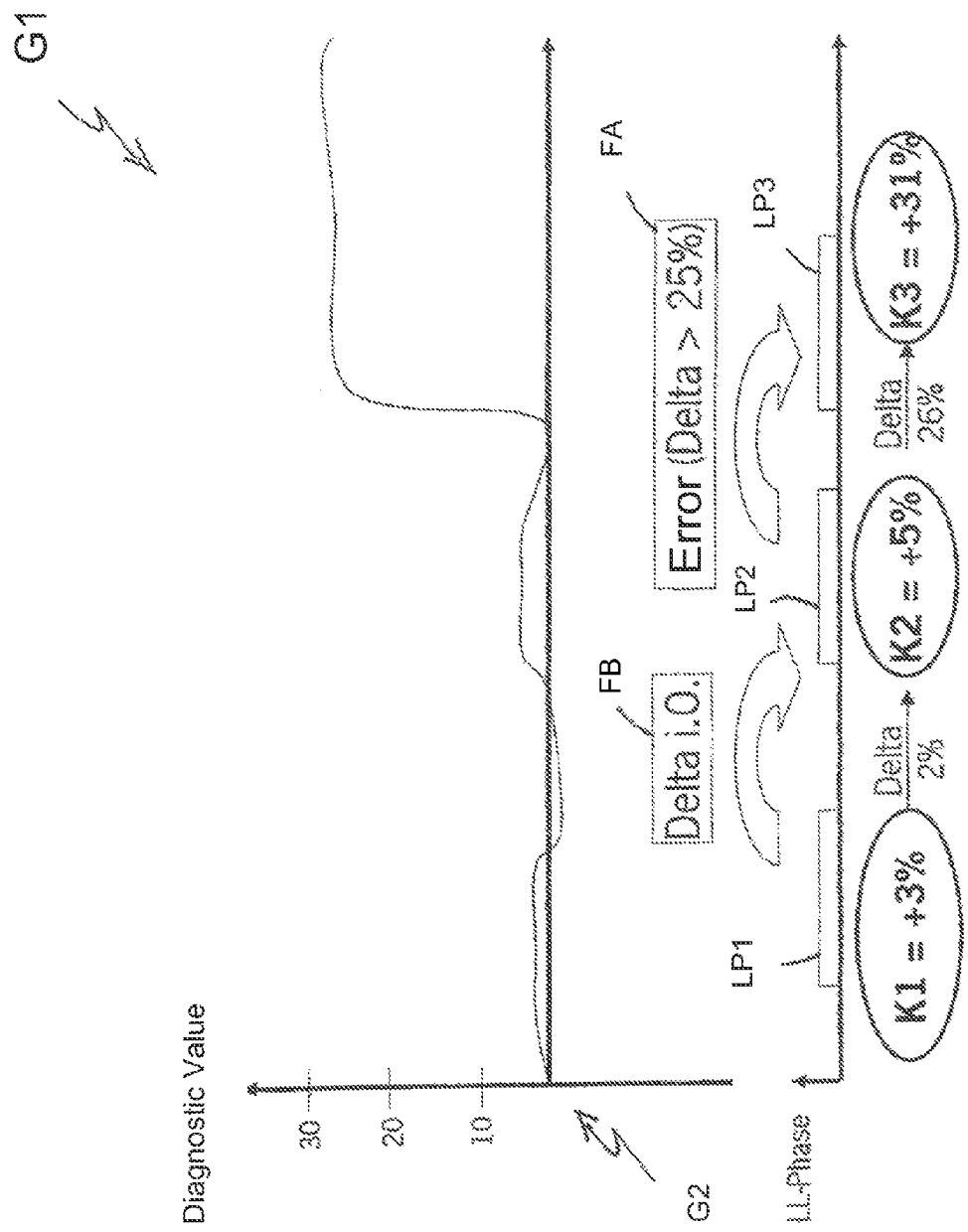
FIG. 2 is a diagram of two graphs represented one on top of the other, the upper graph of which shows measurement results of the method according to the invention, and the lower graph of which shows, inter alia, a time profile of the idling phases of a tested internal combustion engine.

FIG. 2 shows two graphs G1, G2 which are illustrated one on top of the other, the upper graph G1 of which shows measurement results of the method according to the invention. In the upper graph G1, the ordinate represents the diagnostic value as a percentage, and the abscissa represents the time.

A lower graph G2 shows, apart from the text and symbols which serve to explain the method sequence, a time profile of the idling phases LP1, LP2, LP3 of the internal combustion engine which is being examined within the scope of the method according to the invention.

The time axes (abscissas) of the two graphs G1, G2 have simultaneous profiles, that is to say identical x values correspond in each case to identical times during the execution of the method according to the invention.

The time profile of the idling phases LP1, LP2, LP3 is illustrated in the manner of a step function in the lower graph G2 (the ordinate is assigned the value Y="high" when the internal combustion engine is in an idling phase LP1, LP2, LP3 at a specific time, while y=0 means that the internal combustion engine is not in an idling phase at a specific time).

In addition, the previously described correction values K1, K2, K3 together with corresponding delta values are illustrated below the abscissas of the lower graph G2. The threshold value T has been set to 25%, as is indicated in the field FA.

The first initial correction value K1 is +3%, while the second initial correction value K2 is +5%, which corresponds to a delta value of 2%. This delta value undershoots the threshold value T, that is to say the delta value is, as described under FIG. 1, found to be "satisfactory (O.K.)" (field FB). The first follow-on correction value K3 is 26%, which, as described under FIG. 1, corresponds to a delta value of 26%. This delta value exceeds the threshold value T, which means that the line system is considered to be faulty (field FA).

A possible extension of the diagnostic strategy can be a comparison of the respective reference value with a plurality of successive correction values and/or the application of specific statistic functions.

A possible additional condition may be, for example, that in environmental conditions which are not found to be satisfactory for an applicable number of driving cycles the system switches over to extended threshold values after a throttle valve adaptation.

As a result, a basic concept of the invention can also be formulated as "relative comparison of a correction value, for example of a throttle valve correction value into two or more successive idling phases for evaluating a faulty state such as, for example, a leak in the line system".

The invention claimed is:

1. A method for performing diagnostics on a line system, including a crank casing venting system of an internal combustion engine, which comprises the steps of:

forming a correction value for an operating parameter of the internal combustion engine in each of at least two chronologically successive determining steps; and using the correction values or values which are derived therefrom to detect a faulty state of the line system; and carrying out a comparison operation including:

comparing a present correction value with a reference value; and concluding that there is an intact line system, and acceptance of the present correction value as a new reference value for a subsequent comparison operation when at least one criterion of a comparison is met.

2. The method according to claim 1, which further comprises carrying out the chronologically successive determining steps in an idling phase of the internal combustion engine.

3. The method according to claim 1, wherein a difference between comparison partners which are to be respectively compared in at least one of the comparisons is formed and then a threshold value is predefined, wherein a comparison criterion relates to a relative position of a difference or an absolute value of the difference from the threshold value.

4. The method according to claim 1, wherein a formation of at least one of the correction values takes place only if predefined diagnostic conditions which prevail at a respective time are met.

5. The method according to claim 1, which further comprises storing a respective last valid reference value of concluded diagnostics in a non-volatile data memory.

6. A method for performing diagnostics on a line system, including a crank casing venting system of an internal combustion engine, which comprises the steps of:

forming a correction value for an operating parameter of the internal combustion engine in each of at least two chronologically successive determining steps; and using the correction values or values which are derived therefrom to detect a faulty state of the line system;

determining a first initial correction value in an initial comparison operation in a first idling phase;

determining a second initial correction value in a second idling phase which follows the first idling phase; and comparing the two first and second initial correction values with one another in an initial comparison, and one of the first and second initial correction values is accepted as a reference value depending on a result of the initial comparison.

7. The method according to claim 6, wherein when a criterion of the initial comparison is met, the method is continued in a subsequent follow-on comparison operation which follows the initial comparison and includes the further steps of determining a further correction value in the follow-on comparison operation;

comparing the further correction value with a valid reference value in the follow-on comparison; and concluding that there is one of a defective line system and an intact line system depending on a result of the follow-on comparison operation.

* * * * *